United States Patent
Olson et al.

(10) Patent No.: US 10,580,216 B2
(45) Date of Patent: *Mar. 3, 2020

(54) SYSTEM AND METHOD OF SIMULATING FIRST-PERSON CONTROL OF REMOTE-CONTROLLED VEHICLES

(71) Applicant: Disney Enterprises, Inc., Burbank, CA (US)

(72) Inventors: Joseph Logan Olson, Burbank, CA (US); Michael P. Goslin, Burbank, CA (US); Clifford Wong, Burbank, CA (US); Timothy Panec, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,517

(22) Filed: May 15, 2018

(65) Prior Publication Data

US 2018/0268612 A1     Sep. 20, 2018

Related U.S. Application Data

(63) Continuation of application No. 15/018,764, filed on Feb. 8, 2016, now Pat. No. 9,996,978.

(51) Int. Cl.
*G06T 19/00*     (2011.01)
*G06F 3/01*     (2006.01)
(Continued)

(52) U.S. Cl.
CPC ........ *G06T 19/006* (2013.01); *G02B 27/0172* (2013.01); *G05D 1/0016* (2013.01);
(Continued)

(58) Field of Classification Search
CPC ............................ G06T 19/006; G05D 1/0038
See application file for complete search history.

(56) References Cited

U.S. PATENT DOCUMENTS 6,179,619 B1   1/2001   Tanaka
8,585,476 B2   11/2013  Mullen
(Continued)

FOREIGN PATENT DOCUMENTS

WO     2014053346      4/2014

OTHER PUBLICATIONS

Virtual Reality & Interaction URL: http://graphics.cs.cmu.edu/nsp/course/15-462/Spring04/slides/23_vr.pdf, Dec. 31, 2013, 21 pages.

*Primary Examiner* — Jeffery A Brier
(74) *Attorney, Agent, or Firm* — Esplin & Associates, PC

(57) ABSTRACT

Systems and methods of simulating first-person control of remoted-controlled vehicles are described herein. The system may include one or more of a remote-controlled (RC) vehicle, a display interface, an input interface, and/or other components. The RC vehicle may have an image capturing device configured to capture in-flight images. View information representing the captured images may presented on a display worn and/or otherwise accessible to user. The input interface may allow the user to provide control inputs for dictating a path of the RC vehicle. Augmented reality graphics may be overlaid on the view information presented to the user to facilitate gameplay and/or otherwise enhance a user's experience.

18 Claims, 4 Drawing Sheets

(51) Int. Cl.
  *G06F 1/16*   (2006.01)
  *H04N 5/232*  (2006.01)
  *G02B 27/01*  (2006.01)
  *G05D 1/00*   (2006.01)
  *G06F 3/14*   (2006.01)

(52) U.S. Cl.
  CPC ........... *G05D 1/0038* (2013.01); *G06F 1/163* (2013.01); *G06F 3/014* (2013.01); *G06F 3/016* (2013.01); *G06F 3/017* (2013.01); *H04N 5/232* (2013.01); *A63F 2300/00* (2013.01); *G02B 2027/014* (2013.01); *G02B 2027/0138* (2013.01); *G06F 3/14* (2013.01); *G06T 2200/24* (2013.01)

(56) References Cited

U.S. PATENT DOCUMENTS

| | | |
|---|---|---|
| 8,817,047 B1 | 8/2014 | Lee |
| 8,944,928 B2 | 2/2015 | Kaps |
| 9,135,753 B2 | 9/2015 | Raghoebardayal |
| 9,996,978 B2 * | 6/2018 | Olson .................... G06F 3/014 |
| 2010/0178966 A1 | 7/2010 | Seydoux |
| 2012/0142415 A1 | 6/2012 | Lindsay |
| 2013/0265333 A1 | 10/2013 | Ainsworth |
| 2014/0240351 A1 | 8/2014 | Scavezze |
| 2015/0062163 A1 | 3/2015 | Lee |
| 2015/0123965 A1 | 5/2015 | Molyneaux |
| 2015/0346722 A1 | 12/2015 | Herz |

* cited by examiner

SYSTEM AND METHOD OF SIMULATING FIRST-PERSON CONTROL OF REMOTE-CONTROLLED VEHICLES

FIELD OF THE DISCLOSURE

This disclosure relates to simulating first-person control of remote-controlled vehicles.

BACKGROUND

Flight simulating systems have been enjoyed by users as a way to experience the thrill of flying from a first-person perspective. However, the views presented to a user are generally all simulated, which may detach the user from a more realistic experience.

SUMMARY

One aspect of the disclosure relates to a system configured for simulating first-person control of remoted-controlled vehicles. The system may comprise one or more of a remote-controlled (RC) vehicle, a display interface, an input interface, one or more physical processors, and/or other components.

The RC vehicle may comprise one or more of an image capturing device, one or more radio-frequency communication components, a controller, and/or other components. The image capturing device may be configure to generate view information and/or other information. The view information may represent visual information captured by the image capturing device. The controller may be configured to perform one or more of receiving control signals to dictate a path of the RC vehicle, obtaining view information representing visual information captured by the image capturing device; effectuating transmission of the view information via the one or more radio frequency communication components, and/or other operations.

The display interface may include one or more of a graphics rendering component, a display, and/or other components. The graphics rendering component may be configured to effectuate presentation of augmented reality images via the display for viewing by a user of the display interface. The augmented reality images may include at least some of the view information.

The input interface may be configured to generate sensor output in accordance with user input. The user input may include gesture-based input, and/or other input via the input interface.

The one or more physical processors may be configured by machine-readable instructions. Executing the machine-readable instructions may cause the one or more physical processors to perform one or more of receiving the sensor output generated by the input interface, determining the control signals from the sensor output, effectuating communication of the control signals to the one or more radio frequency communication components of the RC vehicle, obtaining the view information from the image capturing device of the RC vehicle, determining augmented reality information that represents one or more augmented reality graphics to be overlaid on the view information, communicating the augmented reality information and the view information to the display interface, and/or other operations. The augmented reality information and the view information may represent the augmented reality images presented via the display of the display interface. The communication of control signals and presentation of the augmented reality images via the display may provide a first-person perspective of the RC vehicle maneuvering along the path to simulate first-person control by the user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
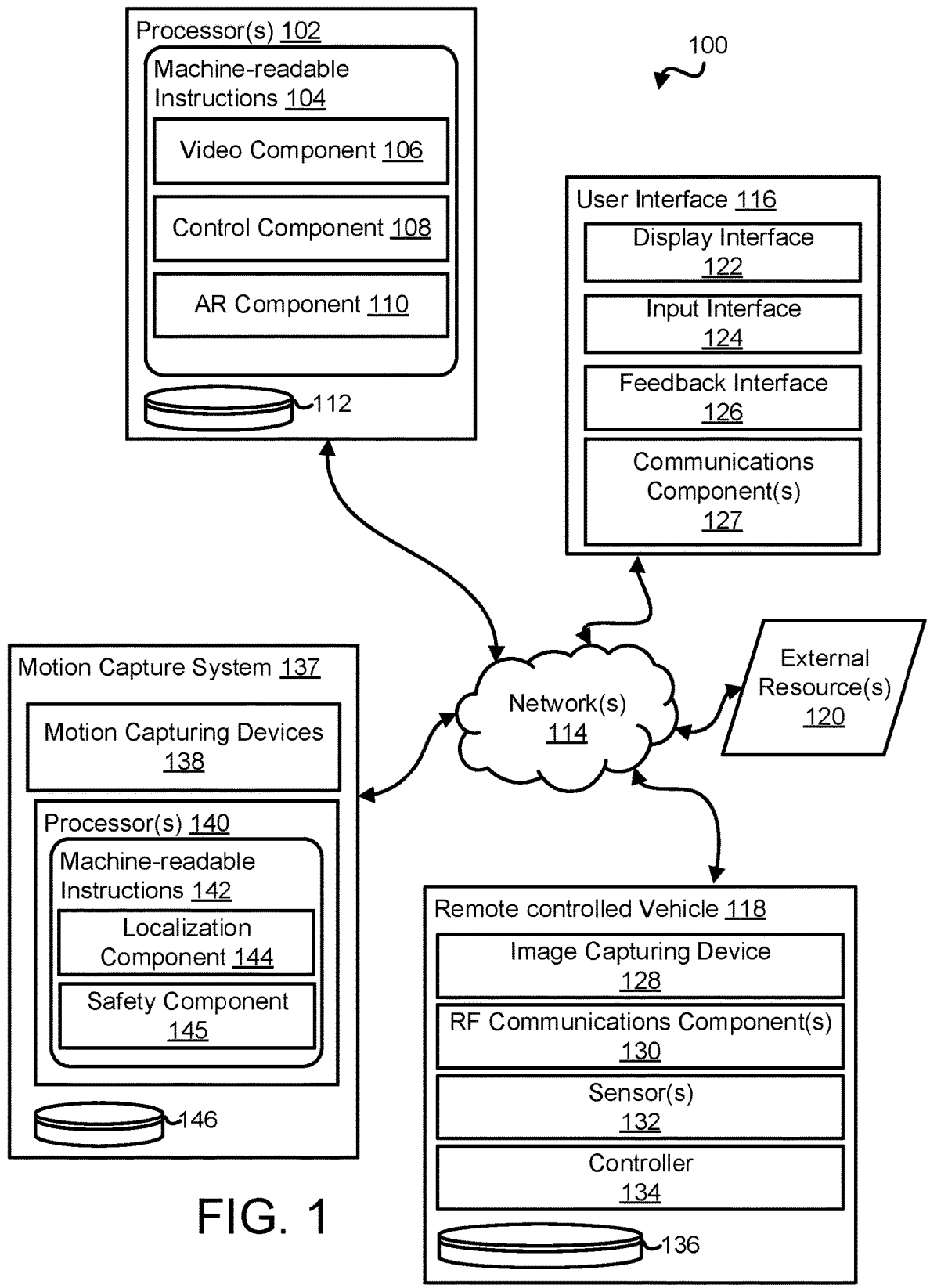
FIG. 1 illustrates a system configured for simulating first-person control of remote-controlled vehicles, in accordance with one or more implementations.

FIG. 1 illustrates a system 100 configured for simulating first-person control of remoted controlled vehicles. In some implementations, the system 100 may comprise one or more of one or more physical processors 102, a user interface 116, one or more remoted-controlled vehicles (e.g., remote-controlled vehicle 118), a motion capture system 137, and/or other components.

The remoted-controlled (RC) vehicle 118 may comprise one or more of a flying vehicle, a terrestrial vehicle, a subsurface water vehicle, a surface water vehicle, and/or other remoted-controlled vehicles. By way of non-limiting example, remote-controlled vehicle 118 may comprise one or more of a RC helicopter, an RC multi-copter, an RC airplane, an RC car or truck, an RC motorcycle, an RC submarine, an RC boat, an RC hovercraft, and/or other remoted-controlled vehicles. Individual ones of the above listed RC vehicles may include respective drive components. By way of non-limiting example, a flying vehicle may include one or more of a motor, a power and/or fuel source, a propeller, a wing, ailerons, jet propulsion components, and/or other components. A terrestrial vehicle may include one or more of a motor, a power and/or fuel source, wheels, steering components, and/or other components. A subsurface water vehicle and/or surface water vehicle may include one or more of a motor, a power and/or fuel source, a ballast, a propeller, a fan, and/or other components.

It is noted that the above description of various forms of RC vehicle is provided for illustrative purposes only and is not to be considered limiting. For example, in some implementations, one or more RC vehicles may be of other form factors and/or may include one or more other components.

In some implementations, RC vehicle 118 may include one or more of an image capturing device 128, one or more radio frequency communication components 130, one or more sensors 132, a controller 134, electronic storage 136, and/or other components.

The image capturing device 128 may include one or more of one or more processors, an imaging sensor, electronic storage, and/or other components. The image capturing device 128 may be configured to generate view information, and/or other information. View information may represent visual information incident on an imaging sensor and/or other sensors. An imaging sensor may comprise one or more of a charge-coupled device sensor, an active pixel sensor, a complementary metal-oxide semiconductor sensor, an N-type metal-oxide-semiconductor sensor, and/or other imaging sensors.

In some implementations, visual information may comprise sensor output generated an imaging sensor based on light and/or electromagnetic radiation incident on the imaging sensor (referred to as real-world visual information). The view information may comprise electronic information stored by the image capturing device 128 that may convey the visual information. By way of non-limiting example, the view information may constitute a conversion of the real-world visual information to electronically stored information. In some implementations, the view information may be configured to facilitate visual reproduction of the captured real-world visual information on a display for viewing by a user. By way of non-limiting example, view information may comprise one or more images. View information may define individual pixels of individual images. View information may define one or more of location, color, luminance, and/or other information defining individual pixels.

By way of non-limiting example, image capturing device 128 may include one or more video cameras. View information may comprise information defining pixels of individual images over a sequence of images. The sequence of images may represent a video captured by a video camera.

The one or more radio frequency communication components 130 may include one or more of hardware, software, and/or other components configured to facilitate the wireless communication of information to and/or from RC vehicle 118. By way of non-limiting example, the one or more radio frequency communication components 130 may include one or more of a receiver, transmitter, transceiver, and/or other components. The one or more radio frequency communication components 130 may be configured to emit and/or receive radio signals (e.g., electromagnetic waves) conveying information.

The one or more sensors 132 may be configured to generate output conveying motion information associated with RC vehicle 118. Motion information may include one or more of a position, a location, an orientation, a velocity, an acceleration, an altitude, pitch, roll, yaw, and/or other information associated with motion of RC vehicle 118 within a real-world environment. By way of non-limiting example, one or more sensors 132 may include one or more of a global positioning system (GPS), an accelerometer, a gyroscope, an inertial measurement unit, a pressure sensor, an altimeter, magnetometer, and/or other sensors.

The controller 134 may comprise one or more of hardware, software, and/or other components configured to control and/or manage one or more components of RC vehicle 118. By way of non-limiting example, controller 134 may be configured to perform one or more of obtaining control signals conveying information to dictate a path of the RC vehicle 118, controlling one or more drive components of RC vehicle 118 in accordance with control signals to maneuver RC vehicle 118 along the path, obtain view information representing visual information captured by image capturing device 128, effectuate transmission of the view information via the one or more radio frequency communication components 130, and/or other operations.

By way of non-limiting example, one or more radio frequency communication components 130 may be configured to receive control signals communicated to RC vehicle 118 from one or more sources (e.g., user interface 116 and/or control component 108 of one or more processors 102). The controller 134 may obtain the signals from the one or more radio frequency communication components 130. The controller 134 may implement the control signals to control one or more components of RC vehicle (e.g., drive components and/or other components).

User interface 116 may be configured to facilitate user interaction with one or more components of system 100. User interface 116 may include one or more of a display interface 122, an input interface 124, a feedback interface 126, one or more communications components 127, and/or other components.

The display interface 122 may include one or more of a graphics rendering component (not shown in FIG. 1), a display (not shown in FIG. 1), and/or other components. In some implementations, the graphics rendering component may be configured to obtain view information and/or other information. The graphics component may be configured to effectuate presentation of augmented reality images (see, e.g., AR component 110 of one or more physical processor(s) 102) via the display for viewing by a user of display interface 122. The augmented reality images may include at least some of view information generated by the image capturing device 128 of RC vehicle 118. Graphics rendering component may include, for example, a GPU.

In some implementations, a display of display interface 122 may be configured to present one or more of images, video, augmented reality images, and/or other information. In some implementations, the display may include one or more of a handheld display, a user-worn display, and/or other types of displays. A handheld display may include one or more of a handheld screen, a smartphone display, a tablet display, and/or other handheld devices having a display. A user-worn display may comprise one or more of a head-mounted display, and/or other user-worn displays. A head-mounted display may comprise one or more of glasses, goggles and/or other devices. By way of non-limiting illustration, a head-mounted display may comprise a display included in one or more of a MICROSOFT HOLOLENS headset, GOOGLE GLASS, and/or other devices. In some implementations, the graphics rendering component and display may be incorporated in a single device.

The input interface 124 may comprise one or more components configured to generate output signals that facilitate determining control signals to dictate a path of RC vehicle 118. The input interface 124 may include one or more of an electro-mechanical input mechanism (e.g., a joystick, actuators, buttons, a keypad, and/or other input mechanisms), one or more sensors, an image-based motion sensing device, a voice recognition device (e.g., configured to facilitate voice command prompting), and/or other components.

In some implementations, the one or more sensors of input interface 124 may be configured to generate output signals conveying motion information associated with the one or more sensors. The motion information may include one or more of a position, an orientation, a velocity, an acceleration, and/or other information associated with motion of the one or more sensors in a real-world environment. By way of non-limiting example, the one or more sensors may comprise one or more if an inertial measurement unit, a GPS, an accelerometer, a pressure sensor, a gyroscope, magnetometer, and/or other sensors.

In some implementations, input interface 124 may be disposed on one or more wearable articles. By way of non-limiting example, in some implementations, one or more sensors of input interface 124 may be included in and/or otherwise disposed on one or more gloves, and/or other wearable articles. User input may comprise gesture-based input. By way of non-limiting example, a user may perform hand gestures and/or other gestures while wearing the one or more gloves. The one or more sensor may generate output conveying motion of the one or more gloves. The sensor output may be associated with one or more control signals configured for dictating a path of RC vehicle 118.

In some implementations, sensor output signals may be associated with one or more particular control signals based on one or more control specifications. By way of non-limiting example, control component 108 of one or more processors 102 may employ one or more control specifications describing association between sensor output from input interface 124 and control signals for controlling drive components and/or other components of RC vehicle 118, described in more detail herein.

In some implementations, an image-based motion sensing device may be configured to generate output associated with physical gestures performed by a user. Output may correspond to detected and/or recognized gestures performed by the user. For example, an image-based motion sensing device may comprise a motion capture camera, such as the MICROSOFT KINECT, and/or other devices.

The feedback interface 126 may be configured to provide one or more of auditory, tactile, and/or other feedback to a user. The feedback interface 126 may include one or more of one or more audio components, one or more tactile components, and/or other components. The one or more audio components may comprise one or more audio reproduction devices configured to provide auditory feedback. An audio reproduction device may comprise one or more of headphones, ear buds, a speaker, and/or other audio reproduction devices. In some implementations, the reproduction of audio by the one or more audio components may be dictated by AR component 110 of one or more processors 102 (described in more detail herein), and/or other components of system 100.

The one or more tactile components may include one or more tactile stimulation devices configured to provide tactile feedback. A tactile simulation device may comprise one or more of a vibrator, a heater, and/or other tactile stimulation devices. In some implementations, one or more tactile stimulation devices may be configured to be held and/or worn by a user. By way of non-limiting example, one or more tactile stimulation devices may be included in and/or otherwise disposed on one or more gloves and/or other wearable articles. In some implementations, one or more tactile stimulation devices may be included in the same gloves worn by the user that include one or more sensors of input interface 124. In some implementations, one or more tactile stimulation devices may be disposed in one or more of a vest, a shirt, shoes, pants, and/or other wearable articles.

In some implementations, activation of one or more tactile simulation devices may be controlled based on output signals generated by one or more sensors 132 of RC vehicle 118 (described in more detail herein), and/or other components of system 100. By way of non-limiting example, feedback interface 126 may be configured to provide tactile feedback to a user based on motion information associated with RC vehicle 118. In some implementations, motion of RC vehicle 118 in one or more directions cause one or more tactile simulation devices to activate in accordance with the directions of motion. For example, RC vehicle 118 may accelerate in a first direction (e.g., to the left). A first tactile simulation device may be disposed at a first location on the user corresponding to the first direction (e.g., a glove worn on their left hand). Sensing of the acceleration of RC vehicle 118 in the first direction may cause the first tactile simulation device to activate.

By way of non-limiting illustration, RC vehicle 118 may comprise a flying vehicle. RC vehicle 118 may be controlled to turn in a first direction and/or perform other flight dynamics. One or more sensors 132 may be configured to generate sensor output conveying one or more of a speed of the turn in the first direction, an angle of the turn in the first direction, and/or other flight dynamics information. If the first direction is towards the right side of RC vehicle 118 (or other direction), then one or more tactile stimulation devices disposed on a right hand and/or right side of the user may be activated. In some implementations, an intensity of activation of the tactile stimulation device may be proportional to one or more of the speed of the turn in the first direction, an angle of the turn in the first direction, and/or other flight dynamics information associated with the controlled turn.

The one or more communication components 127 of user interface 116 may include one or more of hardware, software, and/or other components configured to facilitate the wireless communication of information to and/or from user interface 116. By way of non-limiting example, the one or more communication components 127 may include one or more of a receiver, transmitter, transceiver, and/or other components. One or more of the one or more communication components 127 may be configured to emit and/or receive radio signals (e.g., electromagnetic waves).

The one or more physical processors 102 may be configured by machine-readable instructions 104. Executing the machine-readable instructions 104 may cause the one or more physical processors 102 to facilitate simulating first-person control of RC vehicle 118. The machine-readable instructions 106 may include one or more of a video component 106, a control component 108, an augmented reality component 110 (abbreviated "AR Component 110" in FIG. 1), and/or other components.

In some implementations, the video component 106 may be configured to obtain view information generated by the image capturing device 128 of RC vehicle 118, and/or other information. Video component 106 may be configured to recognize, identify, and/or track objects represented within the view information (e.g., within the field of view of image capturing device 128).

By way of non-limiting example, video component 106 may be configured to execute one or more of object recognition, computer vision, and/or other techniques for recognizing, identifying, and/or tracking objects within the view information. For example, video component 106 may execute techniques including one or more of histogram of oriented gradients (HOG), Scale-invariant feature transform (SIFT), Speeded Up Robust Features (SURF), simultaneous localization and mapping (SLAM), corner detection, blob detection, edge detection, optical flow, object tracking, structure from motion (SFM), bundle adjustment, computer vision, and/or other techniques for recognizing, identifying, and/or tracking objects within the view information.

Control component 108 may be configured to perform one or more of obtaining sensor output generated by one or more components of input interface 124; determining control signals from the sensor output; effectuating communication of determined control signals to one or more radio frequency communication components 130 of RC vehicle 118; and/or other operations. Control component 108 may employ one or more control specifications for determining control signals from sensor output and/or other output generated by one or more components of input interface 124.

By way of non-limiting example, a control specification may include one or more of a look-up table, a conversion chart, and/or information that may facilitate determining control signals from output generated by input interface 124. For example, a control specification may specify one or more of that a first sensor output generated by one or more sensor of input interface 124 may be associated with to a first control signal for controlling RC vehicle 118, a second sensor output generated by one or more sensor of input interface 124 may correspond to a second control signal for controlling RC vehicle 118, a first gesture may be associated with a third control signal, a first voice command may be associated with a fourth control signal, and/or other specifications.

In some implementations, the first sensor output may convey first motion information associated one or more sensor of input interface 124. The first control signal may dictate a first control of RC vehicle 118. By way of non-limiting example, the first motion information may specify that the one or more sensors of input interface 124 moved in a first direction, and/or other motion information. The first control may include advancing RC vehicle 118 in the first direction and/or other directions.

By way of non-limiting illustration, a user may be wearing gloves including one or more sensors of input interface 124. The user may make a gesture with their hands, such as, advancing their hands forward and away from their body. RC vehicle 118 may be controlled in a relative forward direction and/or other directions.

It is noted that the above example of gesture-based user input facilitating control of RC vehicle 118 is provided for illustrative purposes only and not to be considered limiting. For example, in some implementations, control specification may specify associations between other sensor output related to other gestures for controlling RC vehicle 118 in other ways. By way of non-limiting illustration, one or more gestures conveyed by sensor output may be specifically associated with one or more of acceleration, deceleration, directional change, lift off, take off, landing, banking, rolling, submerging, surfacing, ascending, descending, and/or other controls of RC vehicle 118.

The AR component 110 may be configured to determine augmented reality information, and/or other information. Augmented reality information may represent one or more augmented reality graphics to be overlaid on view information. By way of non-limiting example, augmented reality information may include one or more of identifications of individual pixels defined by the view information, graphics information including new definitions of individual pixels to be overlaid on the identified pixels of the view information in accordance with one or more augmented reality graphics, and/or other information.

In some implementations, augmented reality information may be determined based on one or more of: one or more real-world objects that may have been recognized, identified, and/or tracked within the view information; simulated gameplay (e.g., single-player, multi-player, and/or other gameplay modes); and/or other techniques. In some implementations, one or more augmented reality graphic represented by the augmented reality information may be configured to be overlaid on one or more real-world objects depicted within the view information.

In some implementations, AR component 110 may store and/or otherwise access augmented reality specification information, and/or other information. Augmented reality specification information may facilitate one or more of identifying augmented reality graphics to overlay, positioning augmented reality graphics, defining appearance of augmented reality graphics, and/or operations. Appearance of augmented reality graphics may correspond to one or more of a size, shape, tilt, rotation, and/or other appearances of augmented reality graphics.

In some implementations, augmented reality specification information may include one or more of association information, gameplay information, and/or other information. Association information may specify associations between real-world objects and augmented reality graphics. Associations may be one or more of one-to-one, one-to-many, many-to-many, and/or many-to-one.

By way of non-limiting example, association information may specify that a first real-world object may be associated with a first augmented reality graphic. Augmented reality specification information may specify that the first augmented reality graphic is to be positioned over the first real-world object. In some implementations, a size, shape, tilt, rotation, and/or other appearances of augmented reality graphics may change as a size, shape, tilt, rotation, and/or other appearances of corresponding real-world objects change within the view information. By way of non-limiting example, augmented reality component 110 may be configured to perform one or more of identifying the first real-world object depicted in the view information; determining that the first augmented reality graphic is to be overlaid on the first real-world object; determining one or more of a size, shape, tilt, or rotation of the first real-world object; configuring the presentation of the first augmented reality graphic based on the determined one or more size, shape, tilt, or rotation of the first real-world object; and/or other operations.

In an exemplary implementation, the first real-world object may comprise an RC vehicle controlled by another user (and within the field of view of image capturing device 128). The first augmented reality graphic may comprise a game entity (e.g., a virtual combatant, and/or other game entity) configured to be overlaid over the views of the other user's RC vehicle.

Gameplay information may specify one or more of individual positions, sizes, shapes, tilt, rotation, and/or other appearances of individual augmented reality graphics with respect to simulated gameplay. Gameplay may comprise one or more of combat, racing, obstacle courses, dancing, collaborating, chasing, mimicking, and/or other types of gameplay. In some implementations, individual augmented related graphics may represent game entities, such as virtual objects, with which a user may interact. One or more components of user interface 116 may be configured to facilitate effectuating gameplay effects and/or actions. By way of non-limiting example, one or more gesture inputs and/or other user inputs via user interface 116 may be associated with one or more gameplay effects and/or actions. Gameplay effects may comprise one or more of firing virtual weapons, activating virtual shields, tracking, targeting, teleporting, transforming, and/or other effects and/or actions. One or more gameplay effects may be provided as augmented reality graphics overlaid on the view information presented to a user. By way of non-limiting example, a gameplay effect of firing a virtual weapon may cause an augmented reality graphic of a projectile to traverse across the presented view information.

The augmented reality information and the view information may represent augmented reality images presented via the display of display interface 122. AR component 110 may be configured to communicate the augmented reality information, the view information, and/or other information to display interface 122 of user interface 116. The graphics rendering component of display interface 122 may be configured to render the augmented reality images from the augmented reality information and view information and effectuate presentation of the augmented reality images on the display of display interface 122.

The communication and subsequent implementation of control signals and presentation of the augmented reality images via the display may provide a first-person perspective of RC vehicle 118 maneuvering along a path to thereby simulate first-person control by the user.

Motion capture system 137 may comprise one or more components disposed within a real-world environment where one or more of RC vehicle 118, one or more users, and/or other components may be located. Motion capture system 137 may be configured to determine localization information associated with RC vehicle 118 within the real-world environment. Localization information may include one or more of a position, an orientation, and/or other information associated with RC vehicle 118 within the real-world environment. In some implementations, position, orientation, and/or other information associated with RC vehicle 118 may reference a coordinate system established within the real-world environment.

In some implementations, motion capture system 137 may comprise one or more of one or more motion capturing devices 138, one or more physical processors 140, electronic storage 146, and/or other components. The one or more motion capturing devices 138 may comprise one or more devices configured to generate information conveying position, orientation, and/or other information associated with RC vehicle 118. In some implementations, individual motion capturing devices 138 may comprise an image capturing device (not shown in FIG. 1), and/or other components. The image capturing device may be configured to generate view information, and/or other information. By way of non-limiting example, individual motion capturing devices 138 may comprise a motion capture camera, and/or other devices.

In some implementations, individual motion capturing devices 138 may be positioned at various location within the real-world environment in which the RC vehicle 118 may be disposed. By way of non-limiting example, individual motion capturing devices 138 may be disposed at one or more perimeter positions of the real-world environment to define a perimeter of the real-world environment.

The one or more physical processors 140 of the motion capture system 137 may be configured by machine-readable instructions 142. Executing the machine-readable instructions 142 may cause the one or more physical processors 140 to determine localization information associated with RC vehicle 118 and/or other operations. The one or more physical processors 140 may include one or more of a localization component 144, a safety component 145, and/or other components.

The localization component 144 may be configured to obtain view information generated by the one or more motion capturing devices 138. The localization component 144 may be configured to determine, from the view information, one or more of a position, an orientation, and/or other information associated with RC vehicle 118. For example, the view information may comprise images of RC vehicle 118 within the real-world environment. The localization component 144 may be configured to determine a position, an orientation, and/or other information associated with RC vehicle 118 from the view information. For example, localization component 144 may employ one or more image processing techniques, object tracking, motion estimation, computer vision, and/or other techniques configured to determine the position, orientation, and/or other information associated with RC vehicle 118 within the real-world environment with respect to a reference coordinate system.

The safety component 145 may be configured to generate safety control signals. Safety control signals may be determined based on one or more of the position, orientation, and/or other information associated with RC vehicle 118, an established perimeter of the real-world environment, and/or other information. In some implementations, safety control signals may be associated with restricting a path of RC vehicle 118 with respect to an established perimeter of the real-world environment. Safety component 145 may be configured to effectuate communication of safety control signals to RC vehicle 118. In some implementations, safety control signals may be configured to override control signals implemented by controller 134 in accordance with user input. In some implementations, safety control signals may be associated with one or more of a speed change, a directional change, and/or other control of RC vehicle 118 to ensure RC vehicle stays within a perimeter of the environment.

It is noted that the above example of safety control signals is provide for illustrative purposes only and not should be considered limiting. By way of non-limiting example, in some implementations, safety control signals may be determined and/or implemented in accordance with one or more other safety procedures. Such procedures may include one or more of avoiding impact of RC vehicle 118 with a user and/or other objects; limiting maximum velocity, acceleration, and/or turning speeds; and/or other safety procedures.

Figure 2:
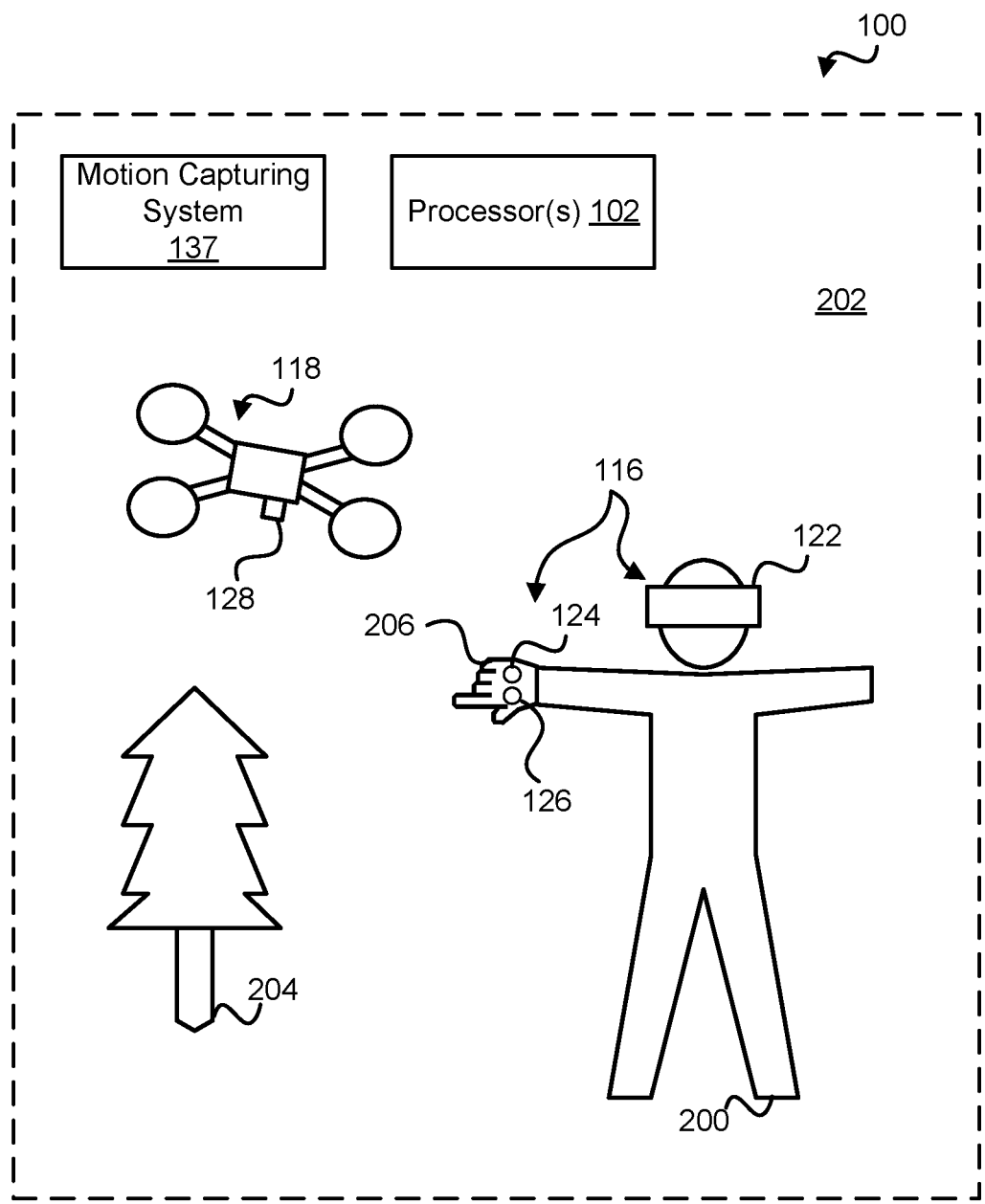
FIG. 2 illustrates an exemplary implementation of the system of FIG. 1.

FIG. 2 illustrates an exemplary implementation of system 100 of FIG. 1. FIG. 2 illustrates a user 200 of RC vehicle 118 in a real-world environment 202. The real-world environment may include one or more real-world objects, such as a first real-world object 204. For illustrative purposes, RC vehicle 118 may comprise a flying vehicle, such as a multi-copter. RC vehicle 118 may include image capturing device 128 and/or other components described herein. Image capturing device 128 may generate view information representing visual information within the field of view of image capturing device 128.

User interface 116 may include one or more of display interface 122 (e.g., a user-worn display and/or other components), input interface 124 (e.g., one or more sensors disposed on a glove 206 worn by user 200, and/or other components), feedback interface 126 (e.g., one or more tactile stimulation devices disposed on the glove 206, and/or other components), and/or other components. User 200 may provide gesture-based input via glove 206, and/or other input.

Figure 3:
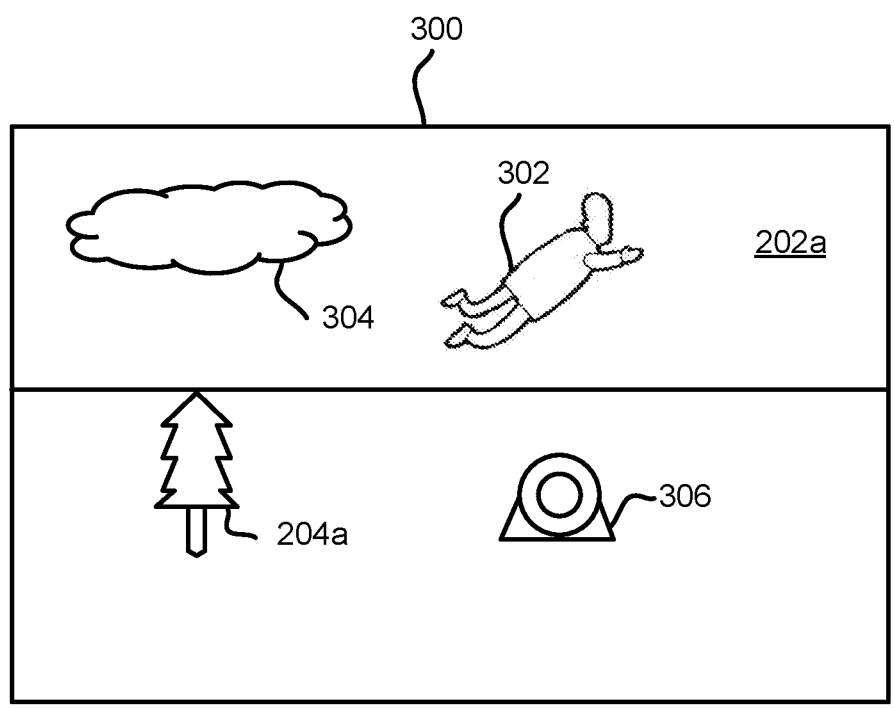
FIG. 3 illustrates an exemplary presentation on a display of a display interface depicting augmented reality graphics overlaid on view information comprising real-world captured images.

FIG. 3 illustrates an exemplary presentation on a display 300 of a display interface (e.g., display interface 122 of FIG. 2) depicting an augmented reality image (e.g., augmented reality graphics overlaid on view information). The view information presented on display 300 may comprise depictions of one or more of the real-world environment 202a the RC vehicle may be disposed in, one or more real-world objects within the field of view (e.g., a depiction of first real-world object 204a), and/or other visual elements.

The augmented reality graphics may include one or more of a first graphic 302, a second graphic 304, and/or other graphics. In some implementations, first graphic 302 may correspond to a real-world object portrayed by the view information. For example, the first graphic 302 may be a graphic configured to be overlaid on another RC vehicle within the real-world environment associated with another user. First graphic 302 may comprise, for example, a virtual combatant with which the user may engage in gameplay with. Third graphic 306 may comprise a virtual object, for example, a target. Third graphic 306 may be determined with respect to one or more types of gameplay the user and/or other users may be engaged in.

Returning to FIG. 1, one or more processor(s) 102, user interface 116, RC vehicle 118, motion capture system 137, and/or external resources 120 may be operatively linked via one or more electronic communication links. For example, such electronic communication links may be established, at least in part, via network(s) 114, such as one or more of a wifi network, the Internet, and/or other networks. It will be appreciated that this is not intended to be limiting and that the scope of this disclosure includes implementations in which one or more processor(s) 102, user interface 116, RC vehicle 118, motion capture system 137, and/or external resources 120 may be operatively linked via some other communication media.

By way of non-limiting example, network(s) 114 may be configured to facilitate communication of one or more of: radio signals between two or more of input interface 124, one or more physical processors 102, or RC vehicle 118; view information between two or more of RC vehicle 118, display interface 122, or one or more physical processors 102; augmented reality information between one or more physical processors 102 and display interface 122; and/or other communications.

The external resources 120 may include sources of information, hosts, and/or providers of virtual spaces outside of system 100, external entities participating with system 100, external entities for player-to-player communications, and/or other resources. In some implementations, some or all of the functionality attributed herein to external resources 120 may be provided by resources included in system 100.

The processors (e.g., 102, 140) may respectively include communication lines or ports to enable the exchange of information with entities included in the system 100. Illustration of processor(s) 102 and/or 140 in FIG. 1 are not intended to be limiting. The respective processors may include a plurality of hardware, software, and/or firmware components operating together to provide the functionality attributed herein to processor(s) 102 and/or 140. For example, processor(s) 102 may be implemented by a cloud of computing platforms operating together as processor(s) 102.

Electronic storage 112, 136, and/or 146 may comprise electronic storage media that electronically stores information. The electronic storage media of electronic storage 112, 136, and/or 146 may include one or both of storage that is provided integrally (i.e., substantially non-removable) with respective ones of processor(s) 102, RC vehicle 11, and/or motion capture system 137; and/or removable storage that is removably connectable respective ones of processor(s) 102, RC vehicle 11, and/or motion capture system 137 via, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage 112, 136, and/or 146 may individually store software algorithms, information determined by respective ones of processor(s) 102, RC vehicle 11, and/or motion capture system 137, information received from other ones of processor(s) 102, RC vehicle 11, and/or motion capture system 137, and/or other information that enables individual ones of processor(s) 102, RC vehicle 11, and/or motion capture system 137 to function as described herein.

By way of non-limiting example, processor(s) 102 may include one or more of a physical processor, a digital processor, an analog processor, a digital circuit designed to process information, an analog circuit designed to process information, a state machine, and/or other mechanisms for electronically processing information. Although processor(s) 102 is shown in FIG. 1 as a single entity, this is for illustrative purposes only. In some implementations, processor(s) 102 may include one or more processing units. These processing units may be physically located within the same device, or processor(s) 102 may represent processing functionality of a plurality of devices operating in coordination. The processor(s) 102 may be configured to execute components 106, 108, and/or 110. Processor(s) 102 may be configured to execute components 106, 108, and/or 110 by software; hardware; firmware; some combination of software, hardware, and/or firmware; and/or other mechanisms for configuring processing capabilities on processor(s) 102.

It should be appreciated that although components 106, 108, and/or 110 are illustrated in FIG. 1 as being co-located within a single processing unit, in implementations in which processor(s) 102 includes multiple processing units, one or more of components 106, 108, and/or 110 may be located remotely from the other components. The description of the functionality provided by the different components 106, 108, and/or 110 described above is for illustrative purposes and is not intended to be limiting, as any of components 106, 108, and/or 110 may provide more or less functionality than is described. For example, one or more of components 106, 108, and/or 110 may be eliminated, and some or all of its functionality may be provided by other ones of components 106, 108, 110, and/or other components. As another example, processor(s) 102 may be configured to execute one or more additional components that may perform some or all of the functionality attributed below to one of components 106, 108, and/or 110.

Figure 4:
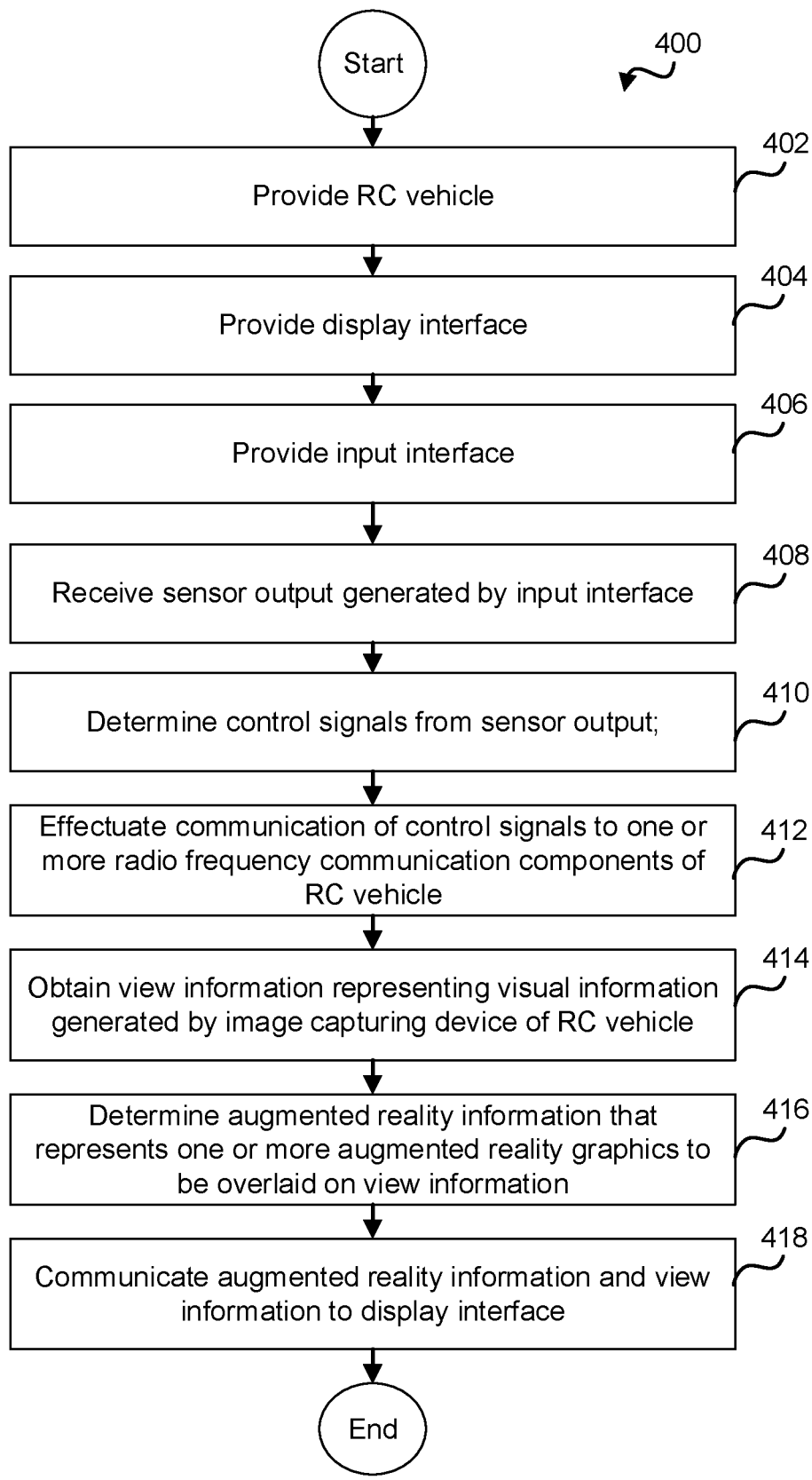
FIG. 4 illustrates a method of simulating first-person control of remote-controlled vehicles, in accordance with one or more implementations.

FIG. 4 illustrates a method 400 of simulating first-person control of remoted-controlled vehicles. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in system comprising one or more of one or more processing devices (e.g., a digital processor, an analog processor, a digital circuit designed to process information, an analog circuit designed to process information, a state machine, and/or other mechanisms for electronically processing information), storage media storing machine-readable instructions, one or more RC vehicles, one or more user interfaces, and/or other components. By way of non-limiting illustration, method 400 may be implemented using system 100 of FIG. 1. The one or more processing devices may include one or more devices executing one or more operations of method 400 in response to instructions stored electronically on electronic storage media. The one or more processing devices may include one or more devices configured through hardware, firmware, and/or software to be specifically designed for execution of one or more of the operations of method 400.

At an operation 402, a remote-controlled vehicle may be provided. The vehicle may comprise one or more of an image capturing device, one or more radio frequency communication components, a controller, and/or other components. The controller may be configured to perform one or more of receiving control signals to dictate a path of the vehicle, obtaining view information representing visual information captured by the image capturing device, effectuating transmission of the view information via the one or more radio frequency communication components, and/or other operations. In some implementations, operation 402 may be performed with an RC vehicle that is the same or similar as RC vehicle 118 (shown in FIG. 1 and described herein).

At an operation 404, a display interface may be provided. The display interface may comprise one or more of a graphics rendering component, a display, and/or other components. In some implementations, the graphics rendering component may be configured to effectuate presentation of augmented reality images via the display for viewing by a user of the display interface. The augmented reality images may include at least some of the visual information represented by the view information. In some implementations, operation 404 may be performed with a display interface that is the same or similar as display interface 122 (shown in FIG. 1 and described herein).

At an operation 406, an input interface may be provided. The input interface may comprise one or more input sensors configured to generate sensor output in accordance with user input, and/or other components. User input may include gesture-based input. In some implementations, operation 406 may be performed with an input interface that is the same or similar as input interface 124 (shown in FIG. 1 and described herein).

At an operation 408, sensor output generated by the input sensors of the input interface may be obtained. In some implementations, operation 408 may be performed by one or more physical processors executing a control component the same as or similar to control component 108 (shown in FIG. 1 and described herein).

At an operation 410, control signals may be determined from the sensor output generated by the input sensors of the input interface. In some implementations, operation 410 may be performed by one or more physical processors executing a control component the same as or similar to the control component 108 (shown in FIG. 1 and described herein).

At an operation 412, communication of the control signals to the one or more radio frequency communication components of the vehicle may be effectuated. In some implementations, operation 412 may be performed by one or more physical processors executing a control component the same as or similar to the control component 108 (shown in FIG. 1 and described herein).

At an operation 414, view information may be obtained from the image capturing device of the RC vehicle. In some implementations, operation 414 may be performed by one or more physical processors executing a video component the same as or similar to the video component 106 (shown in FIG. 1 and described herein).

At an operation 416, augmented reality information may be determined. The augmented reality information may represents one or more augmented reality graphics to be overlaid on the view information. In some implementations, operation 416 may be performed by one or more physical processors executing an augmented reality component the same as or similar to the augmented reality component 110 (shown in FIG. 1 and described herein).

At an operation 418, the augmented reality information and the view information may be communicated to the display interface. The augmented reality information and the view information may represent the augmented reality images presented via the display. In some implementations, operation 418 may be performed by one or more physical processors executing an augmented reality component the same as or similar to the augmented reality component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to simulate first-person control of remoted-controlled vehicles used to play an augmented reality game, the system comprising:
   a remote-controlled vehicle comprising:
      an image capturing device; and
      a hardware controller configured to:
         receive control signals to dictate a path of the vehicle; and
         obtain view information representing visual information captured by the image capturing device;
   a display interface including a graphics rendering component and a display, the graphics rendering component being configured to effectuate presentation of augmented reality images via the display for viewing by a user of the display interface;
   an input interface, the input interface comprising one or more input sensors configured to generate sensor output in accordance with user input; and
   one or more physical processors configured by machine-readable instructions to:
      determine the control signals from the sensor output;
      effectuate communication of the control signals to the vehicle;
      obtain the view information from the image capturing device;
      determine augmented reality information that represents one or more augmented reality graphics to be overlaid on the view information, wherein determining the augmented reality information comprises:
identifying a first real-world object depicted in the view information, the first real-world object comprising a second vehicle controlled by a second user; and
determining that a first augmented reality graphic is to be overlaid on the first real-world object, the first augmented reality graphic comprising a game entity of the augmented reality game;
communicate the augmented reality information and the view information to the display interface, the augmented reality information and the view information representing the augmented reality images presented via the display,
wherein the presentation of the augmented reality images provides a first-person perspective of the vehicle to simulate first-person control by the user;
obtain user input from the user associated with gameplay actions within the augmented reality game;
obtain second user input from the second user associated with second gameplay actions within the augmented reality game; and
wherein determining the augmented reality information further comprises:
configuring a presentation of a second augmented reality graphic based on the user input such that the second augmented reality graphic depicts the gameplay actions; and
configuring a presentation of a third augmented reality graphic based on the second user input such that the third augmented reality graphic depicts the second gameplay actions, and wherein the second gameplay actions are depicted as being performed by the game entity.

2. The system of claim 1, further comprising:
one or more wireless communications networks configured to facilitate communication of one or more of:
information between two or more of the input interface, the one or more physical processors, or the vehicle;
the view information between two or more of the vehicle, the display interface, or the one or more physical processors; or
the augmented reality information between the one or more physical processors and the display interface.

3. The system of claim 1, further comprising a motion capture system, the motion capture system being disposed in an environment of the vehicle, the motion capture system comprising:
one or more motion capture devices configured to generate second view information representing second visual information captured by the one or more motion capture devices, the second view information conveying views of the vehicle within the environment; and
a set of one or more physical processors configured by machine-readable instructions to:
obtain the second view information; and
determine, based on the second view information, position and/or orientation of the vehicle within the environment.

4. The system of claim 3, wherein the set of one or more physical processors of the motion capture system are further configured by machine-readable instructions to:
based on the position and/or orientation of the vehicle, effectuate communication of safety control signals to the vehicle, the safety control signals being configured to restrict the path of the vehicle.

5. The system of claim 1, wherein the display of the display interface is a head mounted display.

6. The system of claim 1, wherein vehicle is one or more of a flying vehicle, a terrestrial vehicle, a subsurface water vehicle, or a surface water vehicle.

7. The system of claim 1, further comprising a feedback interface device, the feedback interface device being configured to generate haptic feedback for a user of the feedback interface device;
wherein the vehicle further comprises one or more motion sensors, the one or more motion sensors being configured to generate output signals conveying motion information associated with the vehicle; and
wherein the one or more physical processors are further configured by machine-readable instructions to:
obtain the output signals generated by the one or more motion sensors of the vehicle; and
dictate control of the feedback interface device based on the output signals generated by the one or more motion sensors of the vehicle.

8. The system of claim 7, wherein the feedback interface device and input interface are disposed on one or more wearable articles.

9. The system of claim 1, wherein the one or more physical processors are further configured by machine-readable instructions such that determining the control signals from the sensor output generated by the one or more input sensors of the input interface is based on control specification, the control specification specifying associations between sensor output generated by the one or more input sensors of the input interface and control signals, such that the control specification specifies that a first sensor output is associated with a first control signal.

10. A method to simulate first-person control of remoted-controlled vehicles used to play an augmented reality game, the method comprising:
receiving, via a hardware controller of a remote-controlled vehicle, control signals to dictate a path of the vehicle;
obtaining, via the hardware controller, view information representing visual information captured by an image capturing device of the vehicle;
effectuating, via a display interface including a graphics rendering component and a display, presentation of augmented reality images via the display for viewing by a user of the display interface;
generating sensor output via an input interface, the input interface comprising one or more input sensors configured to generate the sensor output in accordance with user input;
determining, by one or more physical processors, the control signals from the sensor output;
effectuating, by the one or more physical processors, communication of the control signals to the vehicle;
obtaining, by the one or more physical processors, the view information from the image capturing device;
determining, by the one or more physical processors, augmented reality information that represents one or more augmented reality graphics to be overlaid on the view information, wherein determining the augmented reality information comprises:
identifying a first real-world object depicted in the view information, the first real-world object comprising a second vehicle controlled by a second user; and
determining that a first augmented reality graphic is to be overlaid on the first real-world object, the first augmented reality graphic comprising a game entity of the augmented reality game;

communicating, by the one or more physical processors, the augmented reality information and the view information to the display interface, the augmented reality information and the view information representing the augmented reality images presented via the display, wherein the presentation of the augmented reality images provides a first-person perspective of the vehicle to simulate first-person control by the user;

obtaining user input from the user associated with gameplay actions within the augmented reality game;

obtaining second user input from the second user associated with second gameplay actions within the augmented reality game; and wherein determining the augmented reality information further comprises:

configuring a presentation of a second augmented reality graphic based on the user input such that the second augmented reality graphic depicts the gameplay actions; and configuring a presentation of a third augmented reality graphic based on the second user input such that the third augmented reality graphic depicts the second gameplay actions, and wherein the second gameplay actions are depicted as being performed by the game entity.

11. The method of claim 10, further comprising one or more of:

communicating, by one or more wireless communication networks, information between two or more of the input interface, the one or more physical processors, or the vehicle;

communicating, by the one or more wireless communication networks, the view information between two or more of the vehicle, the display interface, or the one or more physical processors; or communicating, by the one or more wireless communication networks, the augmented reality information between the one or more physical processors and the display interface.

12. The method of claim 10, further comprising:

generating, by one or more motion capture devices of a motion capture system, second view information representing second visual information captured by the one or more motion capture devices, the second view information conveying views of the vehicle within the environment;

obtaining, by a set of one or more physical processors of the motion capture system, the second view information; and determining, by the set of one or more physical processors, position and/or orientation of the vehicle within the environment based on the second view information.

13. The method of claim 12, further comprising:

determining, by the set of one or more physical processors, safety control signals based on the position and/or orientation of the vehicle, effectuating, by the set of one or more physical processors, communication of safety control signals to the vehicle, the safety control signals being configured to restrict the path of the vehicle.

14. The method of claim 10, wherein the display of the display interface is a head mounted display.

15. The method of claim 10, wherein vehicle is one or more of a flying vehicle, a terrestrial vehicle, a subsurface water vehicle, or a surface water vehicle.

16. The method of claim 10, further comprising:

generating haptic feedback for the user using a feedback interface device;

generating output signals conveying motion information associated with the vehicle; and dictating, by the one or more physical processors, control of the feedback interface device based on the output signals conveying the motion information.

17. The method of claim 16, wherein the feedback interface device and input interface are disposed on one or more wearable articles.

18. The method of claim 10, wherein determining the control signals is based on control specification, the control specification specifying associations between sensor output generated by the one or more input sensors of the input interface and the control signals, such that the control specification specifies that a first sensor output is associated with a first control signal.

* * * * *